Patented Aug. 17, 1954

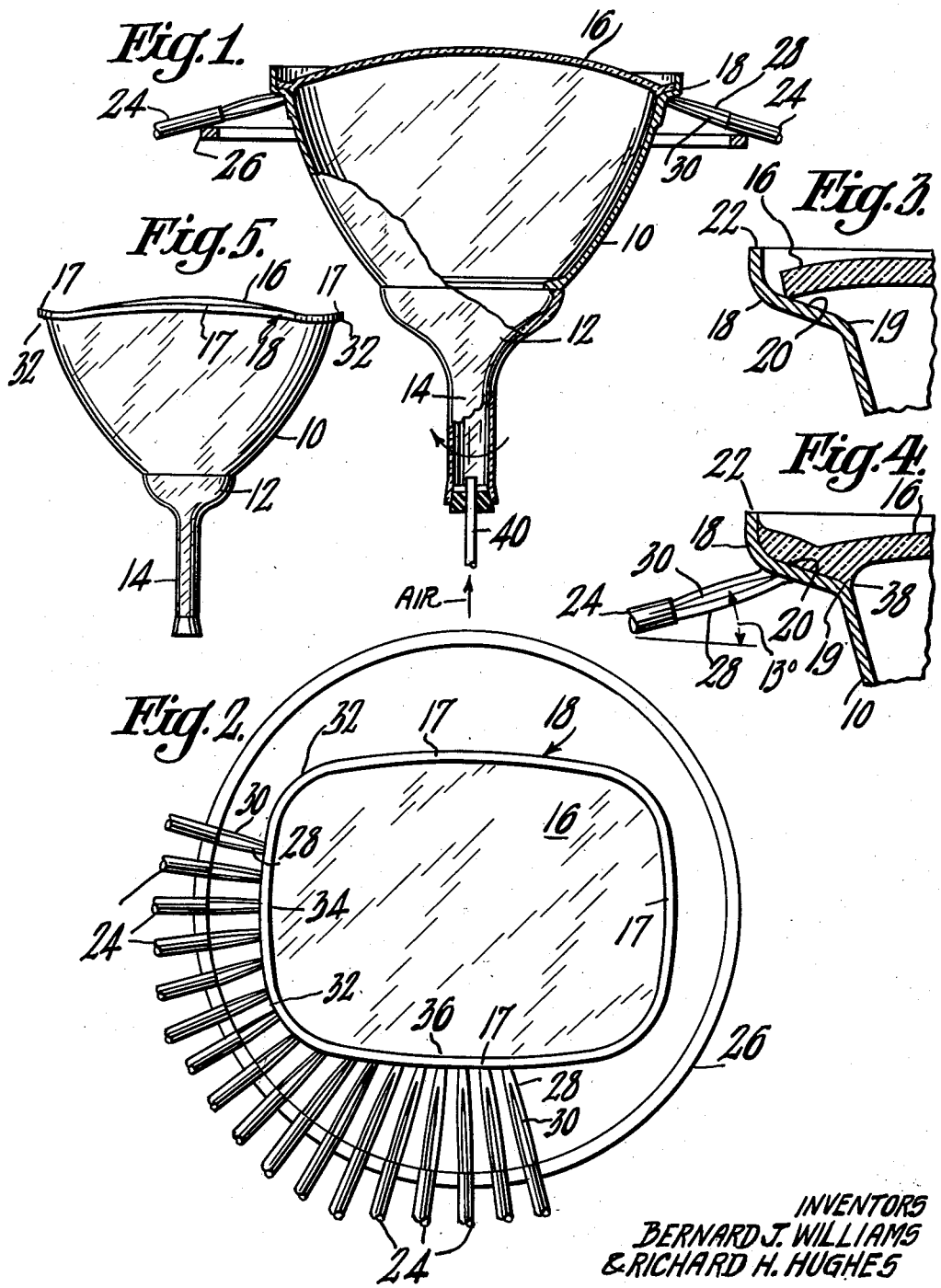

2,686,390

UNITED STATES PATENT OFFICE 2,686,390

SEALING A RECTANGULAR GLASS PANEL INTO A RECTANGULAR METAL FRAME

Bernard John Williams, Allegheny, N. Y., and Richard Henry Hughes, Lancaster, Pa., assignors to Radio Corporation of America, a corporation of Delaware Application April 16, 1952, Serial No. 282,735

6 Claims. (Cl. 49—81)

This invention is directed to the formation of glass to metal seals and more particularly to the method of forming a seal between a substantially rectangular metal frame and a glass plate within the frame.

There are many uses for a glass plate sealed within a metal rectangular frame. Such devices have utility as windows, such as double-glass, moisture-free windows, as well as in the field of cathode ray tubes. In the latter application which includes the field of television, there is an increasing demand for larger and larger picture tubes. This has resulted in the use of conical metal shells to which a large glass face plate is sealed at the larger end of the shell. The shape of the metal cones or shells is preferably rectangular to conform with the aspect ratio of the television picture.

Previously it has been somewhat difficult to satisfactorily seal a glass plate to a rectangularly shaped frame, particularly those used in the manufacture of large metal envelopes for television picture tubes. In such sealing procedures, it is necessary that the edge of the glass plate, which is in contact with the metal frame, be heated uniformly and evenly, so that the sealing procedure can be undertaken rapidly. It is also desirable to use automatic sealing machines for such metal envelopes, which consist of several positions for preheating, sealing, and annealing. It is further desirable that the sealing steps be accomplished automatically at one of the positions or stations, to which the sealing machine is indexed, during the sealing-annealing operation. Furthermore, it is desirable that the sealing take place within a matter of several minutes. This all necessitates a uniform heating of the seal region, automatically.

Various methods of sealing a face plate to a rectangular metal frame of a television tube envelope have been tried, which involve several types of operation. One such attempt, is to arrange the burners around the sealing portion of the metal frame in a substantially rectangular arrangement so that each burner is equally distant from the seal portion to which the glass is to be sealed. This requires that the metal frame or tube envelope be oscillated in the arrangement, in some manner, so that the sealing fires will provide an even heating of the seal region. However, this method has not proved to be satisfactory, since the heating of the metal frame is not uniform and has produced instead spot heating. Furthermore, the gas burner adjustment of the device has been very critical to provide heating approaching uniformity. An alternative method used in sealing glass face plates in rectangular metal frames, or tube envelopes, has been that of rotating the rectangular metal cone about an axis and positioning gas burner around the edge of the metal envelope to which the face plate is to be sealed. The gas burners are cam driven to maintain equal distance between the metal envelope and each gas burner at all times. However, this method has resulted in a machine which is very costly to build and to maintain. Furthermore, this method in actual practice has also produced over-heating of the metal along the longer sides of the rectangular frame work.

It is therefore an object of the invention to provide a method and means for sealing a glass plate to a substantially rectangular metal frame.

It is another object of the invention to provide a relatively simple means and method for sealing a glass plate to a substantially rectangular frame work.

It is a further object of the invention to provide a novel means and method for uniformly heating the seal region of a substantially rectangular frame for sealing the frame to a glass plate.

It is another object of the invention to provide a method and means for uniformly heating all points on a rectangular metal frame for the purpose of securing a uniform seal of a rectangular glass panel into said frame.

It is a further object of the invention to provide a method for uniformly heating and sealing at all points of a seal region of a rectangular metal envelope for the purpose of sealing a rectangular glass face plate to the envelope.

It is another object of the invention to provide means and a method for uniformly sealing a rectangular face plate to the larger rim of a rectangular metal envelope of a television tube.

The invention consists essentially of arranging a plurality of gas burners in a circle at the center of which is mounted a rectangular metal frame with its plane substantially in the plane of the circle. The axis of the rectangular metal frame work is at the center of the circle. The framework is positioned so that upon rotation the seal portions of the frame closest to the circle intercept the inner cones of the gas flames and the seal portions of the frame farthest from the circle lie beyond the end of the inner cones of the gas flames. This arrangement provides a uniform heating at all points of the sealing flange of the frame. The rectangular glass panel is placed on the sealing flange and the metal framework is rotated about its axis at a uniform speed. The burner angle height and flame length is adjusted, so that, by virtue of the differences in linear velocity of different points on the rectangular frame and the convergence of the flames, all points of the seal area are heated to the desired uniformity.

Figure 1 discloses a partial sectional view of a metal tube envelope arranged during the sealing procedure. Figure 2 is a top view of the structure shown in Figure 1. Figures 3 and 4 are enlarged partial sectional views of the seal region of the envelope of Figure 1. Figure 5 is a front view of a cathode ray tube of the type shown in Figure 1.

The method of sealing a plate of glass to a rectangular metal frame is described below as applied specifically to a rectangular type metal tube used for television. This application of the novel method is one which has been successfully performed. However, it is understood that the novel method need not be limited to a metal television tube envelope but may also have equal application to the sealing of a glass plate within any type of a rectangular shaped metal frame work. Such a novel method and procedure may be utilized, for example, in sealing glass plate panes to rectangular shaped window frames. Such a sealing method may also be utilized in the fabrication of double paned windows, for example, in which two glass plates are sealed in a spaced apart relationship to a single metal frame.

Figures 1 discloses metal television tube envelope consisting of a metal frustum 10, the large opening of which forms substantially a rectangular frame. The smaller end of the frustum 10 may be formed with a circular opening to which is sealed a glass funnel portion 12 ending in a tubular portion 14 which provides the neck of the television tube. During the fabrication of the tube, it is necessary that a single large glass plate 16 be sealed to the larger rectangular opening of the metal frustum 10. As can be seen in Figure 2, glass plate 16 is of substantially the same shape and size of the rectangular opening of the envelope. To receive the glass plate 16 and to provide a seal region to which the plate 16 can be sealed, the large opened end of the metal frustum 10 is formed with a flange portion 18, which is formed with a sealing land or seat 20 formed by the flange portion 18 projecting from the surface of the metal shell 10. The sealing land or seat 20 is curved upwardly between adjacent corners flange 18 since land 20 is substantially the intersection between the spherical face plate 16 and the sides of the metal frustum. This produces scalloped edges 17 along the upper end of shell 10 (Figure 5). Flange 18 also has a rim portion 22 projecting out from the sealing land or seat portion 20. This configuration of the flange 18 is readily seen in Figures 3 and 4. The flange portion 18 does not constitute a part of this invention but is fully set forth in U. S. Patents 2,254,090 and 2,296,307 to Power.

In the past, it has been a problem to effectively heat the rectangularly shaped rim 18 of the metal frustum 10 to a uniform temperature so that the glass face plate 16 will seal evenly over all portions of flange 18. If the heating of the flange is not uniform, certain portions of the sealing land 20 become hotter than other portions, so that the glass plate 16 adjacent to these hotter portions will become heated unevenly and will flow at the hotter portions and not at the cooler portions. This results in what is known as spot heating in which the seal formed is not as adherent at the cooler portions as to the hotter portions and unequal stresses are set up in these regions upon cooling. The difficulty then is to obtain a uniform heating of the sealing flange 20 during the sealing operation.

In accordance with the invention, sealing flames are provided from a plurality of burners 24, which are arranged in a circle on a circular frame 26. The burners are all directed toward the center of the circular frame 26. The metal envelope 10 is mounted at the center of the circular frame 26 with the plane of flange 18 perpendicular to the axis of the circular frame 26 and with the axis of the envelope 10 at the center of the circular frame 26. Furthermore, the tubular envelope 10 is positioned along the vertical axis so that the plane of the flange 18 is somewhat above the plane of the circular frame 26, and so that the flames of the burners 24 may be directed upwardly against the lower surface of the flange portion 20. An optimum position is that in which the burners 24 form substantially an angle of 13° to the horizontal, as shown in Figure 4.

The face plate 16 is laid on the sealing land 20 of the flange 18 prior to sealing as shown in Figure 3. As can be noted in Figure 2, since the burners are arranged in a circle, the ends and corners of the rectangular frame 18 are closer to the ring 26 than are the lateral sides of the metal frame. As is well known in the art, the flames of the burners 24, which are formed from a burning mixture of hydrogen and oxygen, consist of an outer cone of flame 28 and a hotter inner cone of flame 30. The flames are now adjusted so that, when the metal frame 18 is rotated about its axis at the center of ring 26, the corner portions 32 of the frame will intercept the inner cone 30 of each flame, while the ends 34 and the sides 36 of the metal frame will extend at different distances from the end of the inner cone 30. This arrangement provides a heating of the corners of the metal frame 18 by hotter flames than those which contact the end and side frame portions 34 and 36 respectively.

During the sealing process, the envelope is rotated at substantially 44 R. P. M. about its axis. Since the corners 32 are farther from the center of rotation than the side and end portions of the frame, they pass more rapidly through the hotter flame regions, in which the flames are spaced farther apart, while the end and side portions 34 and 36 respectively pass more slowly through regions where the flames are somewhat cooler and more closely spaced. In this manner, then, although the corners pass through hotter flames, due to their greater linear velocity and the fact that the flames are spaced farther apart, the result is that the corners are heated to substantially the same temperature as are the end and side frame portions.

Another difficulty experienced in sealing plate 16 within the metal shell 10 is that the presence of the scalloped edges 17 of flange 18 results in an uneven heating of the seal land 20, when the frame is rotated through the sealing flames. However, positioning burners 24 at an angle to the horizontal compensates for this uneven heating. The corners 32 of the frame 18 are lower than the scalloped edges 17 between the corners. However, since the burners are set at an angle to the horizontal and below the plane of frame 18, the corners 32 will contact lower portions of the flames. Also, the scalloped edges 17 of frame 18 being closer to the center of rotation, will contact higher portions of the flames. In this manner and by simple adjustments of the burner positions, all portions of the frame 18 remain in contact with the flames during rotation.

The circular rotation of rectangular metal frame within a circular arrangement of sealing flames, together with the adjustment of the flames, has resulted in a very uniform heating of the sealing land 20. By the above described method, the sealing surface 20 of the rectangular frame 18 is heated to a temperature between 1000° C. and 1100° C. At this temperature, the glass at the edge of the face plate 16 becomes fluid and flows out over the portion 20 of flange 18 and as shown in Figure 4. Due to the fluid nature of the rim of glass plate 16, the plate will tend to sink down into the metal frame and the soft glass at the edge of plate 16 will flow over intersection 17 of the metal frustum 10 and the flange 18. The plate 16 then is blown slightly upward to provide a filet or thin portion 38. The raising of plate 16 is performed by forcing air through a pipe 40 inserted in the open neck of the tube envelope 10 as schematically shown in Figure 1. The face plate 16 is held in this elevated position for approximately 20 seconds, to form a tight bound between the metal and glass. The sealing fires are then removed by tilting the burners 24 upwardly out of the way, for example, and the face plate 16 is allowed to "set" for substantially 15 seconds. At the end of this period, the tube is placed in the annealing ovens for further treatment. This may be done by indexing the carrier 15 to another position at which point the envelope with the face plate sealed thereto is exposed to additional burners or placed within a furnace for annealing.

The above described method of sealing a glass plate to a rectangular frame is one that has proved to be highly satisfactory. It has eliminated rather complex and expensive devices for making such seals and has provided a simple, easily operated method. The method results in a satisfactory uniformity in heating of the sealing area, so that spot heating is eliminated. Although the gas burner adjustment is quite critical, the adjustment of the burners can be easily made and controlled. Because of this method, the sealing of glass plates to metal kinescopes can be done with relatively simple sealing machines and at less expense. These and other advantages are apparent by the use of the novel method.

The above described method of forming the glass to metal seal is one which has been successfully performed with large metal kinescopes, where a uniform seal is of utmost importance. With the use of large television picture tubes, in which the diagonal dimensions of the face plate is in the order of 21 and 24 inches, the forces and tensions set up in the seal region are considerable. Seals of non-uniformity have a much greater tendency to break and fracture under the high pressures and tensions established in the seal region during tube processing and tube evacuation. For these reasons, it is of utmost importance that the glass to metal seal of the face plate to the large metal shell be of optimum uniformity. The novel methed described produces a satisfactory seal for large seal areas with all the described advantages.

What is claimed is:

1. The method of sealing a glass plate to a portion of a substantially rectangular metal frame, said method comprising the steps of, arranging a plurality of burners around a circle having a diameter larger than a diagonal of said metal frame and so that the flames of said burners are directed radially toward the center of said circle, placing said rectangular metal frame with its axis perpendicular to the plane of said circle and at the center thereof and with said frame portion substantially in the plane of the flames of said burners, adjusting the flames of said burners so that the portions of said frame closest to said circle intercept the inner hotter portions of said flames and portions of said frame farther from said circle intercept cooler portions of said flames, placing said glass plate in contact with said metal frame portion, and rotating said metal frame around its axis at a constant speed to uniformly heat said frame portion and seal said glass plate thereto.

2. The method of sealing a glass plate to a portion of a substantially rectangular metal frame, said method comprising the steps of arranging a plurality of burners around a circle having a diameter larger than a diagonal of said metal frame placing said rectangular metal frame with its axis perpendicular to the plane of said circle and at the center thereof and with said frame portion substantially in the plane of the flames of said burners, adjusting the flames of said burners so that the portions of said frame closest to said circle intercept the inner cones of said flames and portions of said frame farthest from said circle lie beyond the end of the inner cones of said flames placing said glass plate in contact with said metal frame portion and rotating said metal frame around its axis to uniformly heat said frame portion and seal said glass plate thereto.

3. The method of sealing a glass plate to a flanged rim of a substantially rectangular frame, said method comprising the steps of, arranging a plurality of burners around a circle having a diameter larger than a diagonal of said metal frame and so that the flames of said burners are directed radially toward the center of said circle, placing said rectangular metal frame with its axis perpendicular to the plane of said circle and at the center thereof and with said frame portion substantially in the plane of the flames of said burners, adjusting the flames of said burners so that the portions of said frame closest to said circle intercept the inner hotter portions of said flames and portions of said frame farther from said circle intercept cooler portions of said frames, placing said glass plate in contact with said metal frame portion, and rotating said metal frame around its axis to uniformly heat said frame portion and seal said glass plate thereto.

4. The method of sealing a glass face plate to a flanged rim of a substantial rectangular frame portion of a metal envelope, said method comprising the steps of, arranging a plurality of burners around a circle having a diameter larger than a diagonal of said metal frame and so that the flames of said burners are directed radially toward the center of said circle, placing said rectangular metal frame with its axis perpendicular to the plane of said circle and at the center thereof and with said frame portion substantially in the plane of the flames of said burners, adjusting the flames of said burners so that the portions of said frame closest to said circle intercept the inner hotter portions of said flames and portions of said frame farther from said circle intercept cooler portions of said flames, placing said glass plate in contact with the flanged rim of said metal frame portion, and rotating said metal envelope around its axis at a constant rate of speed to uniformly heat said frame portion and seal said glass plate to the rim thereof.

5. The method of sealing a glass face plate of a spherical section to a flanged rim of a substantially rectangular frame portion of a metal envelope, said rim having a sealing surface determined by the intersection of said spherical face plate and said rectangular frame portion whereby scalloped portions of said sealing surface extend above the plane of the corners of said sealing surface, said method comprising the steps of, arranging a plurality of burners around a circle having a diameter larger than the diagonal of said metal frame portion, placing said rectangular metal frame portion with its axis perpendicular to the plane of said circle and at the center thereof and with the sealing surface of said frame portion above the plane of said circle, tilting said burners at a small angle to the plane of said circle so that the flames thereof strike the sealing surface of said frame portion, placing said glass plate in contact with the flanged rim of the frame portion, adjusting the flames of said burners so that the corners of said sealing surface closest to said circle intercept the inner hotter portions of said flames and the scalloped portions of said sealing surface intercept the cooler portions of said flames, and rotating said metal envelope around its axis to uniformly heat said frame portion and seal said glass plate to the rim thereof.

6. The method of sealing a spherical glass face plate to a flanged rim of a substantially rectangular frame portion of a metal envelope, said flanged rim being scalloped between the corners of said frame portion, said method comprising the steps of, arranging a plurality of burners around a circle having a diameter larger than the diagonal of said metal frame portion, placing said rectangular metal frame portion with its axis perpendicular to the plane of said circle and at the center thereof and with the frame portion above the plane of said circle, tilting said burners at a small angle to the plane of said circle so that the flames thereof strike the flanged rim, adjusting the flames of said burners so that the corners of said sealing surface closest to said circle intercept the inner hotter portions of said flames and the scalloped portions of said sealing surface intercept the cooler portions of said flames, placing said glass plate in contact with the flanged rim of the frame portion, and rotating said metal envelope around its axis to uniformly heat said frame portion and seal said glass plate to the rim thereof.

References Cited in the file of this patent

UNITED STATES PATENTS

| Number | Name | Date |
|---|---|---|
| 2,237,186 | Malloy | Apr. 1, 1941 |
| 2,361,824 | Dorman | Dec. 31, 1944 |
| 2,573,266 | Melcher et al. | Oct. 30, 1951 |

FOREIGN PATENTS

| Number | Country | Date |
|---|---|---|
| 536,858 | Great Britain | May 29, 1941 |